United States Patent Office 3,295,437
Patented Jan. 3, 1967

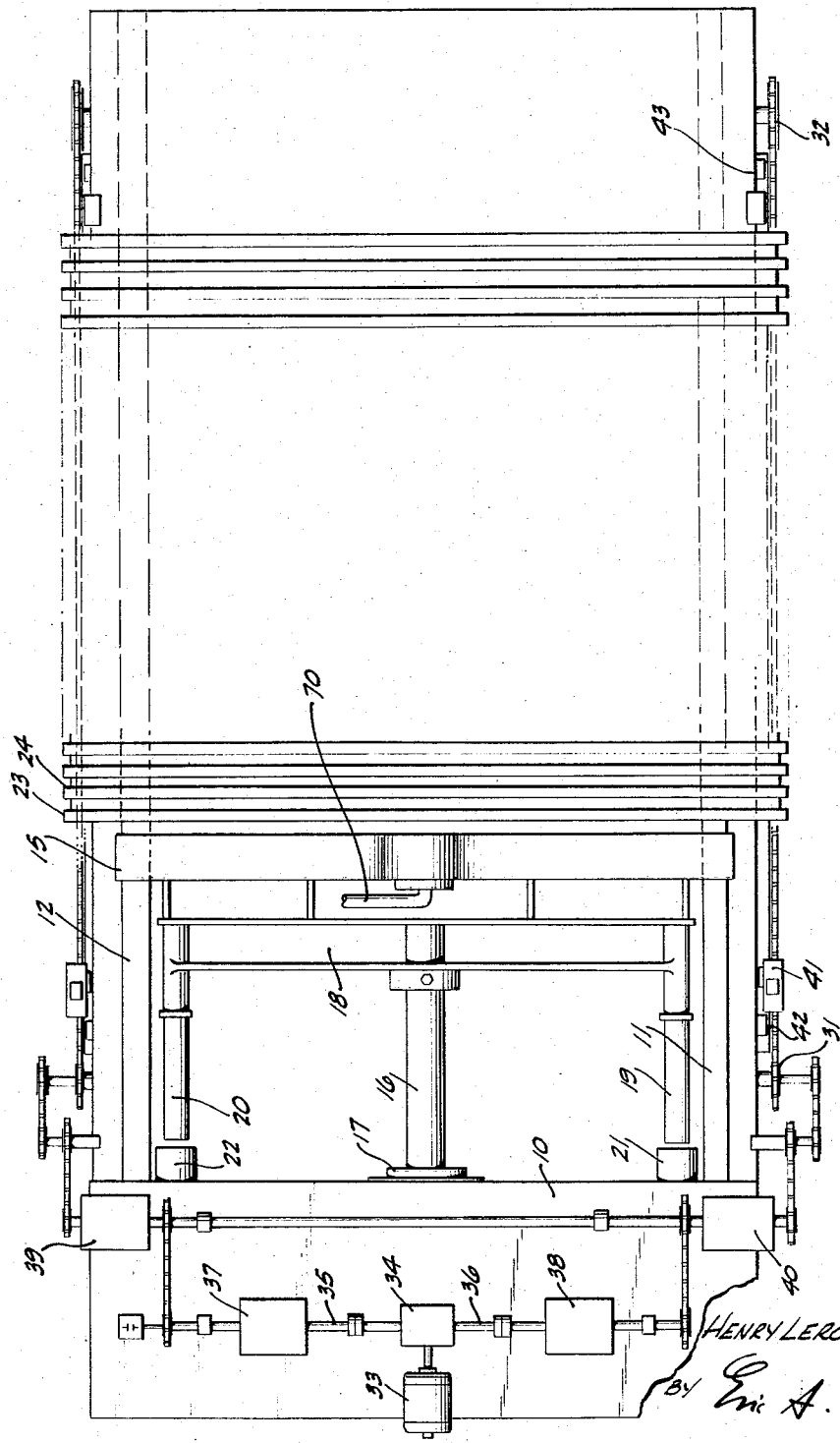

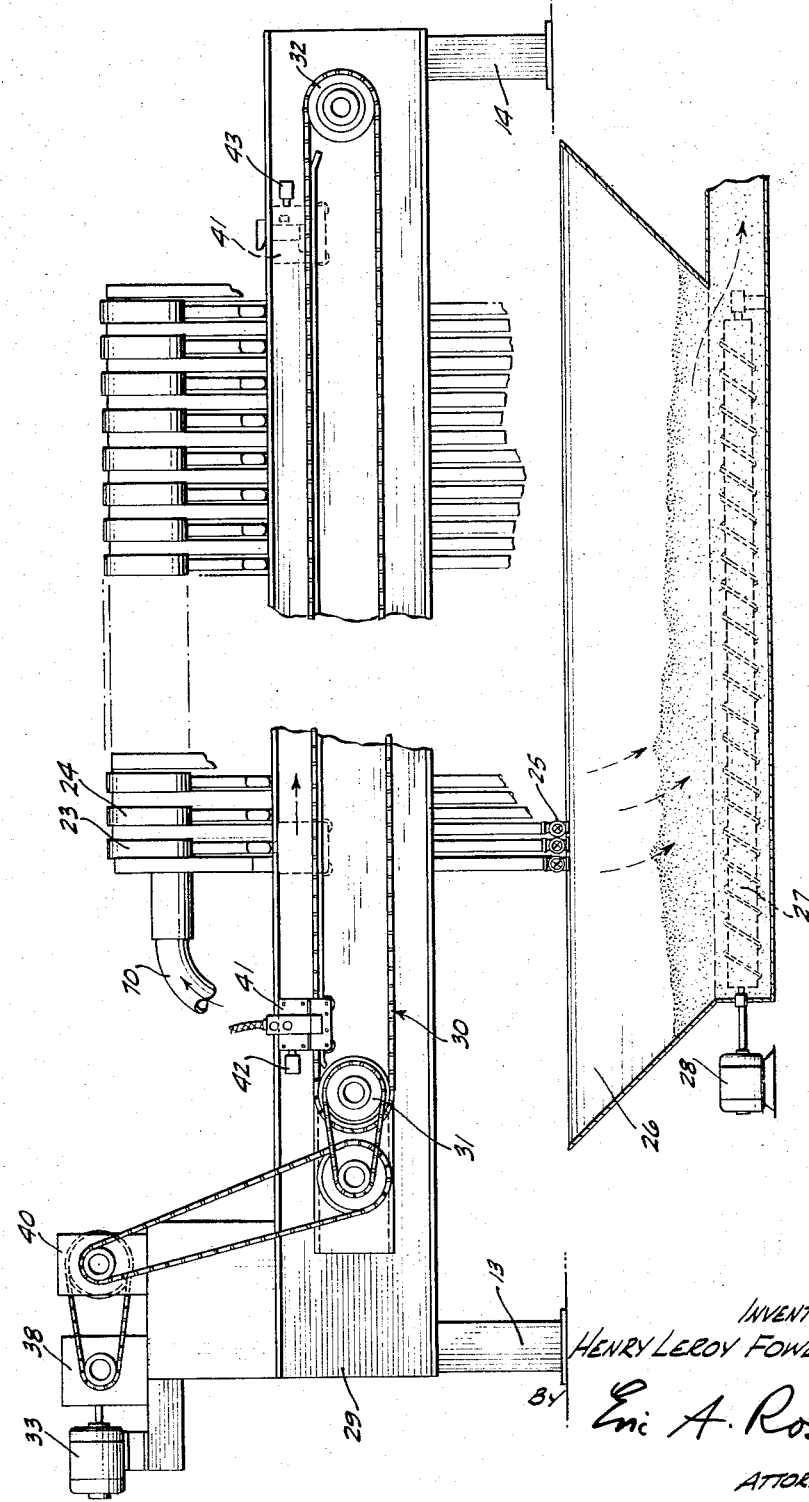

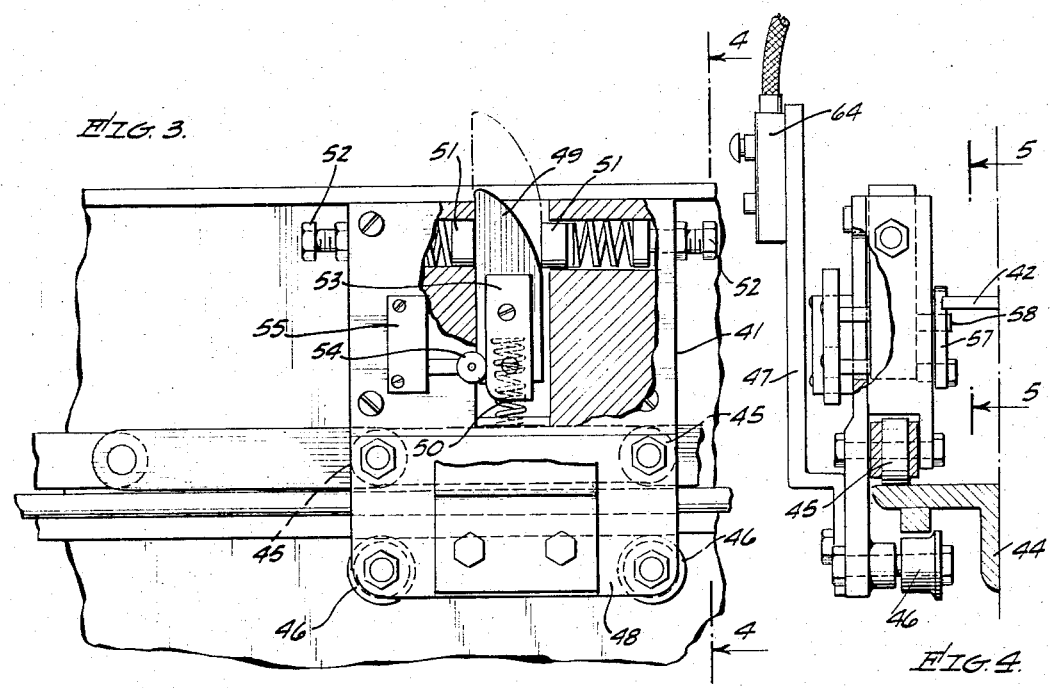

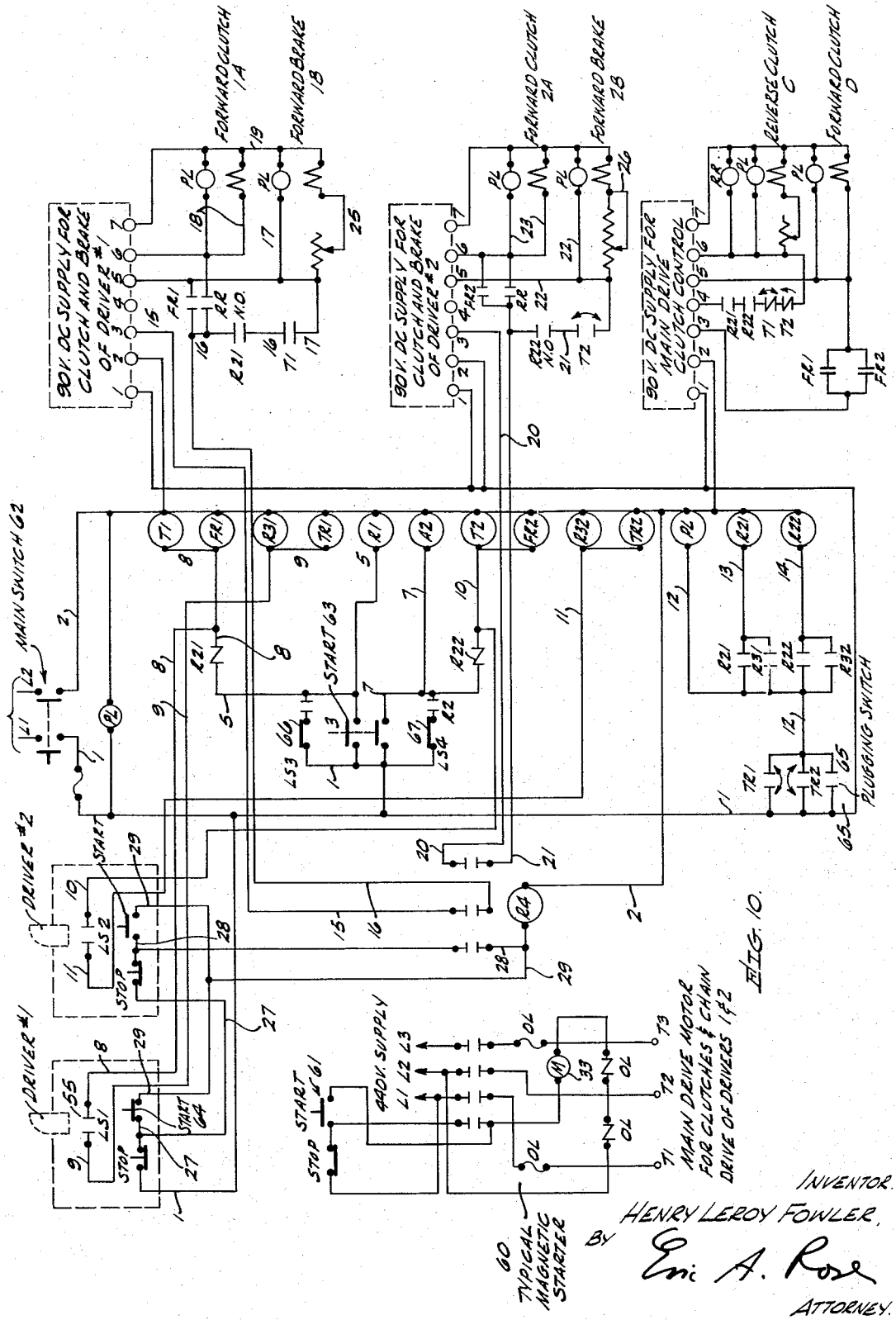

3,295,437
FILTER PLATE SEPARATOR
Henry L. Fowler, 11912 Bayla Ave.,
Norwalk, Calif. 90651
Filed Feb. 24, 1964, Ser. No. 346,693
5 Claims. (Cl. 100—198)

My invention relates to improvements in filter plate separator, and particularly its application to the use of filter plates arranged in a horizontal row and adapted to be moved horizontally for the purpose of separating the filter plates from each other; and the objects of my invention are, first, to provide a novel type of filter plate separator which permits the removal by mechanical means of filtering material accumulated between filter plates, second, to provide a filter plate separator of a filter having the plurality of filter plates arranged in a horizontal row and adapted to be moved against one another which filter plates are separated by mechanical means for the purpose of cleaning the plates and removing filtering material stored between said plates in an efficient, time saving manner, third, to provide a filter plate separator embodying an electrical circuit arrangement designed to separate filter plates in a predetermined, pre-selected, timed operation, fourth, to provide a conveyor system so designed and constructed as to move filter plates arranged in a horizontal row and adapted to be moved against one another in a predetermined, timed operation.

Additional objects, together with further advantages derived in utilizing the present invention, will become apparent from the following, detailed description thereof taken together with the accompanying drawing forming a part of the specification, in which—

FIGURE 1 is a schematic plan view of a filter plate separator using my invention, shown in a fragmentary manner;

FIGURE 2 is an enlarged, side elevational view of my filter plate separator, partially broken away and in section, using my invention;

FIGURE 3 is a side elevational view of a driver forming part of my invention, partially broken away and in section;

FIGURE 4 is an end view of the driver shown in FIGURE 3 viewed in the direction of line 4—4 of FIGURE 3;

FIGURE 5 is a fragmentary view of a driver showing the dog in contact with the latch bar, partially broken away, and viewed in the direction of line 5—5 of FIGURE 4;

FIGURE 6 is a fragmentary view, partially broken away and in section, of the dog and associated parts of a driver, forming part of my invention;

FIGURE 7 is a schematic view showing the dog of a driver in contact with a filter plate;

FIGURE 8 is a schematic view showing the dog of a driver as is passes under a filter plate;

FIGURE 9 is a schematic view showing the dog of a driver in relation to a filter plate after having passed such filter plate;

FIGURE 10 is a wiring diagram showing the electrical circuit arrangement of my invention.

Similar numerals refer to similar parts throughout the several views.

While my device is a filter plate separator which may be employed in any process requiring a separator of the type described in the accompanying drawing, I have used, for the purpose of illustration only and as an example, a filter plate separator used on a filter for the extraction of beer from malted cereal and other ingredients, referred herein as mash.

Beer is a beverage obtained by the alcoholic fermentation of a malted cereal, which may be barley malt with or without other starchy ingredients, and including the addition of hops.

The extraction of beer from the mash is accomplished by filtering processes well known to the beer manufacturing industry.

As shown in the accompanying drawing, the filter comprises generally a frame assembly, a plurality of filter plates arranged in a horizontal row and adopted to be moved one against another, a means to provide power for the filter and my invention designed to move individual filter plates, as hereinafter more fully described.

The frame assembly includes two fixed heads, only one of which, 10, is shown, connected by two laterally spaced, longitudinally-extending, horizontally arranged support members, 11, 12, which maintain the two heads in fixed, spaced relation to each other.

The two heads, one of which, 10, is shown in the drawing, are elevated from the floor at the selected level above the floor by suitable standards, 13, 14, to which the heads are suitably affixed. A ram, 15, is slidably affixed about the support members 11, 12, and adapted to move longitudinally upon such support members.

A piston, 16, is slidably mounted in a cylinder, 17, by suitable packings, not shown in the drawing, for the application of power to the piston to cause it to extend in a longitudinal direction parallel to the support members, 11, 12.

A supporting structure, 18, connects the piston, 16, to the ram, 15, thereby permitting the piston to slide the ram, 15, along and upon the support members 11, 12, in either longitudinal direction away from the cylinder, 17, or towards the cylinder, 17, to a point where movable stops, 19, 20, strike cylindrically shaped fixed stops, 21, 22.

The ram, 15, is thereby permitted to move longitudinally away from the cylinder on its forward stroke for the pressing and filtering operation.

Upon the conclusion of the pressing operation, the return stroke of the piston returns the ram to its starting position. A plurality of filter plates 23, 24, are slidably arranged about the supporting members, 11, 12, and hold the mash, from which the beer is extracted.

A valve, 25, is installed at the bottom of each filter plate, for the control of the extraction of beer from the mash during the filtering operation.

A trough, 26, is provided beneath the frame assembly to receive and collect the mash, after the beer has been extracted therefrom. The mash is removed from the trough by a suitable conveyor arrangement, 27, driven, for instance, by an electrical motor, 28.

A horizontal beam, 29, is attached to the outside of the standards, 13, 14, and extends longitudinally and horizontally therebetween, on either side of the filter.

A chain drive, 30, is suspended on the outside of, and along each beam, 29, on each side of the filter between a front driving gear, 31, and an end gear, 32. The power is transmitted to each chain drive through a suitable system comprising, for instance, an electrical motor, 33, coupled to a differential gear box, 34, connected through suitable shafts, 35, 36, to a clutch, 37, 38, located on either side of the differential gear box and transmitting power through a suitable system of gears and links to a brake, 39, 40, which in turn is connected through suitable linking mechanism to the front driving gear, 31, of the chain drive, 30. The clutch, 37, 38, is a conventional electro-magnetic type clutch including a driving disc and a driven disc held at a predetermined position by a spring plate so that as the coils in the driving disc are energized, the resulting magnetic pull draws the driven disc against the friction lining of the driving disc. The brake, 39, 40, is of the electro-mechanical band-brake type in which a band fits externally about a brake drum actuated by a solenoid acting on an electro-magnet. Alternative electro-magnetic clutch-brake assemblies of conventional type may be used instead of the conventional clutch and brake hereinabove suggested.

Describing my invention on only one side of the filter, a driver, 41, is attached to the chain drive and, during its operation, will travel between a stop plate, 42, and an end limit switch, 43, along the beam, 29, on a track, 44, in an upright position, on top rollers, 45, and bottom rollers, 46, connecting the driver, 41, to the track, 44, by means of a support plate, 47, which driver, 41, engages during its movement, individual filter plates when actuated by electrical impulses, as hereinafter described.

The driver, 41, comprises a housing, 48, containing the switch mechanism for the electrical control system guiding its movements.

A dog, 49, mounted vertically in said housing, 48, rides on a compression spring, 50, and slides vertically between plugs, 51, 51, pressing against opposite sides of the dog, 49, by pressure controlled through an adjustment screw, 52, and a compression spring acting against the plugs, 51, 51.

A contact plate, 53, is mounted on the outside of the dog, 49, and has a rounded lower edge, which, when the dog, 49, is depressed, will engage the contact wheel and lever, 54, of a limit switch, 55.

A latch bar, 56, is mounted on the beam, 29, above the driver, and is positioned between the last filter plate and the end limit switch, 43.

When the driver, 41, moves past the normal position of the last filter plate, the latch bar, 56, will fully depress the dog, 49, causing the dog, 49, to lock in the depressed position by means of a latch, 57, pivotally mounted upon the housing, 48, of the driver, 41, and positioned to engage a pin, 58, mounted on the lower portion of the dog, 49, and extending outwardly therefrom.

Upon striking the end limit switch, 43, mounted on the beam, 29, near the end gear, 32, of the chain driver, 30, the chain drive will reverse the movement of the driver, 41, until the stop plate, 42, strikes the latch, 57, disengaging the latch, 57, from the pin, 58, and releasing the dog, 49, causing the contacts of the limit switch, 55, to be opened and causing the chain drive to stop and the electrical circuit controlling the movement of the driver to become deenergized.

As shown in the wiring diagram, in FIGURE 10 of the drawing, the power supply for the clutches and chain drives of the two drivers, marked for convenience as driver No. 1 and driver No. 2, comprises a motor, 33, and a starting mechanism comprising a typical magnetic starter, 60, actuated by a starting switch, 61.

The movement control circuit of the two drivers is operated in this example, as shown on the wiring diagram, from a 90 volt direct current supply and comprises various switches and relays operated, as hereinafter described.

The sequence operation of the controls illustrated in the diagram involve the starting of the motor, 33, from starting swtich, 61.

The main switch, 62, and the starting switch, 63, is then closed and relays R1 and R2 are energized and their contacts sealed in, maintaining thereby the circuit controlling the movement of the drivers.

The operation of only one driver, driver No. 1, described as driver 41 in the accompanying drawing, is described, since driver No. 2 will perform similarly as hereinafter described.

The closing of relays R1 and R2 causes relay FR1 and time delay relay T1 to be energized from relay R1 and relay R21, the contacts of which are normally closed. When time delay relay T1 is energized, it closes a contact to the forward brake, 1B, and when relay FR1 is energized, it closes the contacts and energizes the forward clutch D.

Starting switch, 64, is now closed, energizing relay R4, and sealing it in, energizing thereby the forward clutch 1A through the contacts of the FR1 relay. The driver, 41, will now drive forward and the dog, 49, will contact the first filter plate, causing the dog to be depressed and to actuate the limit switch, 55.

Relay R1 is thereby energized, and time delay relay TR1 is energized momentarily. The contacts of relay R31 seal in the contacts of relay R21 for the reverse clutch C, deenergizing relay FR1 and time delay relay T1.

The contacts of relay FR1 stop the forward clutches 1A and D, and the contacts of time delay relay T1 remain closed and energize the forward brake 1B through the contacts of relay R21. The forward brake will remain energized according to the time setting of relay T1.

The contacts of time delay relay TR1 will close the plugging switch, 65, until sufficient time for the reverse speed is obtained to maintain closed contacts. The reverse clutch C will not be energized until both drivers are energized and their circuits established, and until time delay relays T1 and T2 have timed out. After time delay relay T1 has timed out, it will energize the reverse clutch C, and the dog, 49, of the driver, 41, will pull the filter plate towards the front of the chain drive against the ram, 15, and will stall and decrease its speed, opening the contacts of the plugging switch, 65.

The opening of the contacts of the plugging switch, 65, will cause the reverse circuit to become deenergized, and the circuit covering the forward movement will again be energized.

The sequence is repeated until the last filter plate has been retrieved by the drivers, and the drivers will then travel forward until the respective dogs are driven under the respective latch bars, tripping the forward travel circuit by actuating the end limit switches, 66 and 67, respectively. The drivers will then reverse their movements, with their dogs depressed, and will stop as soon as they engage their respective stop plates. The movement of the drivers is thereby decreased, and the contacts of the plugging switch, 65, are opened and the reverse circuit relays R21 and R22 are deenergized.

The operation may be restarted by closing the starting switch, 63.

As each filter plate is moved towards the front of the chain drive, the mash held between the individual filter plates drops into the trough, 26, and the filter is ready to operate on a new cycle, when the last filter plate has been retrieved.

The liquid is introduced into the filter through a suitable valve and hose, 70, leading into the filter through the ram, 15.

I do not claim the mechanical structure of the filter itself, which is well known to the art, and has been used in the industry where mash is removed manually. My invention comprises the structure, and electrical circuits associated therewith, of the automatic movement of the filter plates for the purpose of extracting the mash from the filter, and thereby improving the efficiency of the filtering operation involved in the elimination of mash from the filter.

It is understood that various forms of my invention may be used or utilized, embodying the principles of my invention, without departing from the spirit of my invention.

I claim:

1. A device of the class described including a filter having a ram and a rear head and a plurality of filter plates arranged between the ram and the rear head in a horizontal row and adapted to be moved one against another; mechanical means moving successive filter plates consecutively from their position when compressed to a prearranged separated position, such mechanical means including a driver affixed to a chain, said driver comprising a housing, a dog mounted vertically in said housing and riding on a compression spring, a contact plate affixed to the outside of the dog, a limit switch having an operating lever mounted on said housing in proximity to said contact plate in such a manner as to provide contact between said contact plate and said operating lever when the dog is in an intermediate depressed condition, a pin affixed to the dog on the lower portion thereof and extending outwardly therefrom, a latch affixed to the housing in proximity of the dog so as to engage and latch about said pin when the dog is in a totally depressed position, and means positioned above said driver in spaced relation thereto so as to engage and depress the dog when the driver is moved under said means; and electrical means actuating said mechanical means in prearranged timed sequence.

2. A device of the class described including a filter having a ram and a rear head and a plurality of filter plates arranged between the ram and the rear head in a horizontal rod and adapted to be moved one against another; and means moving successive filter plates consecutively from their position when compressed to a prearranged separated position which means include a horizontal beam rigidly affixed to said filter and extending longitudinally and horizontally adjacent to said filter plates, a conveyor system attached to said horizontal beam and adapted to operate along said horizontal beam, a driver affixed to said conveyor system and adapted to move longitudinally and horizontally along said horizontal beam and adjacent to said filter plates, said driver being affixed to said conveyor system and comprising a housing, a dog mounted vertically in said housing and riding on a compression spring, a contact plate affixed to the outside of the dog, a limit switch having an operating lever mounted on said housing in proximity to said contact plate in such a manner as to provide contact between said contact plate and said operating lever when the dog is in an intermediate depressed condition, a pin affixed to the dog on the lower portion thereof and extending outwardly therefrom, a latch affixed to the housing in proximity of the dog so as to engage and latch about said pin when the dog is in a totally depressed position, and means positioned above said driver in spaced relation thereto so as to engage and depress the dog when the driver is moved under said means; and electrical means actuating said conveyor system in prearranged timed sequence.

3. A device of the class described including a filter having a ram and a rear head and a plurality of filter plates arranged between the ram and the rear head in a horizontal row and adapted to be moved one against another; a horizontal beam rigidly affixed to said filter and extending longitudinally and horizontally adjacent to said filter plates; a chain drive having an endless chain attached to the horizontal beam adapted to operate along said beam; a driver affixed to said chain adapted to move longitudinally and horizontally along said horizontal beam adjacent to said filter plates, said driver comprising a housing, a dog mounted vertically in said housing and riding on a compression spring, a contact plate affixed to the outside of the dog, a limit switch having an operating lever mounted on said housing in proximity to said contact plate in such a manner as to provide contact between said contact plate and said operating lever when the dog is in an intermediate depressed condition, a pin affixed to the dog on the lower portion thereof and extending outwardly therefrom, a latch affixed to the housing in proximity of the dog so as to engage and latch about said pin when the dog is in a totally depressed position, and means positioned above said driver in spaced relation thereto so as to engage and depress the dog when the driver is moved under said means; and electrical means actuating said chain drive in prearranged timed sequence, including an electrical motor, means to energize said motor, means to control the operation of said motor and means connecting said motor to said chain drive including an electrically operated clutch and an electrically operated brake and an electrical circuit controlling the operation of said clutch and said brake in prearranged timed sequence.

4. A device of the class described including a filter having a ram and a rear head and a plurality of filter plates arranged between the ram and the rear head in a horizontal row and adapted to be moved one against another; two horizontal beams rigidly affixed to said filter, each extending longitudinally and horizontally adjacent to and on one opposite side of said filter plates; a chain drive having an endless chain attached to each horizontal beam on the outside thereof and adapted to operate along such beam; a driver affixed to each chain adapted to move longitudinally and horizontally along the horizontal beam to which said chain is attached adjacent to said filter plates and adapted to engage and move successive filter plates consecutively from their position when compressed to a prearranged separated position; said driver comprising a housing, a dog mounted vertically in said housing and riding on a compression spring, a contact plate affixed to the outside of the dog, a limit switch having an operating lever mounted on said housing in proximity to said contact plate in such a manner as to provide contact between said contact plate and said operating lever when the dog is in an intermediate depressed condition, a pin affixed to the dog on the lower portion thereof and extending outwardly therefrom, a latch affixed to the housing in proximity of the dog so as to engage and latch about said pin when the dog is in a totally depressed position, and means positioned above said driver in spaced relation thereto so as to engage and depress the dog when the driver is moved under said means; and electrical means operating said chains simultaneously in prearranged timed sequence.

5. In a device of the class described having a plurality of filter plates arranged in a horizontal row and adapted to be moved on a horizontal track one against another, electromechanical means adapted to move and separate adjacent filter plates consecutively along said horizontal track including a plurality of drivers actuated by electrical means operating in prearranged timed sequence and adapted to engage filter plates and move the same from one position in contact with each other to another position in contact with each other along said horizontal track, each of said drivers comprising a housing, a dog mounted vertically in said housing and riding on a compression spring, a contact plate affixed to the outside of the dog, a limit switch having an operating lever mounted on said housing in proximity to said contact plate in such a manner as to provide contact between said contact plate and said operating lever when the dog is in an intermediate depressed condition, a pin affixed to the dog on the lower portion thereof and extending outwardly therefrom, a latch affixed to the housing in proximity of the dog so as to engage and latch about said pin when the dog is in a totally depressed position, and means positioned above said driver in spaced relation thereto so as to engage and depress the dog when the driver is moved under said means; and electrical control means to disengage said drivers from said filter plates at the conclusion of each movement and to discontinue the movement of said drivers upon the conclusion of the separating operation.

References Cited by the Examiner

UNITED STATES PATENTS

| | | | |
|---|---|---|---|
| 2,867,327 | 1/1959 | Hirs | 210—138 X |
| 3,153,630 | 10/1964 | Green | 210—236 X |
| 3,207,315 | 9/1965 | Kurita | 210—236 X |
| 3,232,435 | 1/1966 | Fismer | 210—236 X |
| 3,251,472 | 5/1966 | Kurita | 210—230 |

REUBEN FRIEDMAN, *Primary Examiner.*

SAMIH N. ZAHARNA, *Examiner.*

F. SPEAR, *Assistant Examiner.*